Figure 1:
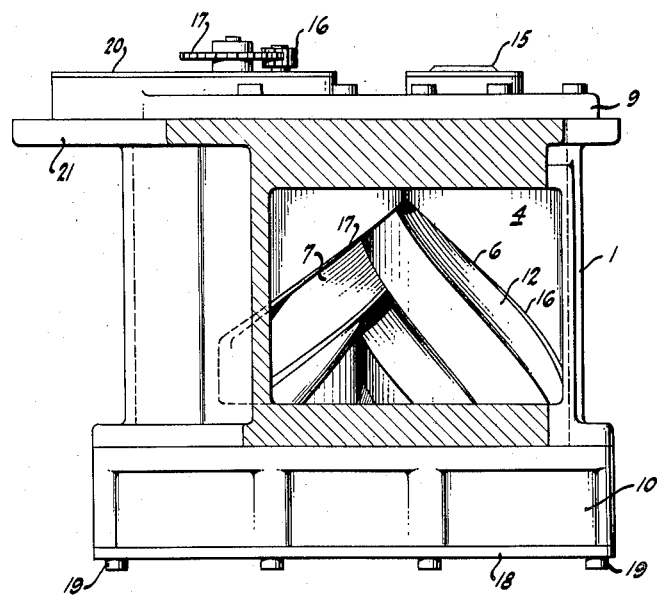

July 15, 1958 W. F. BERCK 2,843,094
POSITIVE DISPLACEMENT TYPE FLUID METER
Filed June 1, 1956 3 Sheets-Sheet 1

INVENTOR.
WILLIAM F. BERCK
BY
Mellin and Hanscom
ATTORNEYS

INVENTOR.
WILLIAM F. BERCK
BY
Mellin and Hanscom
ATTORNEYS

July 15, 1958  W. F. BERCK  2,843,094
POSITIVE DISPLACEMENT TYPE FLUID METER
Filed June 1, 1956  3 Sheets-Sheet 3
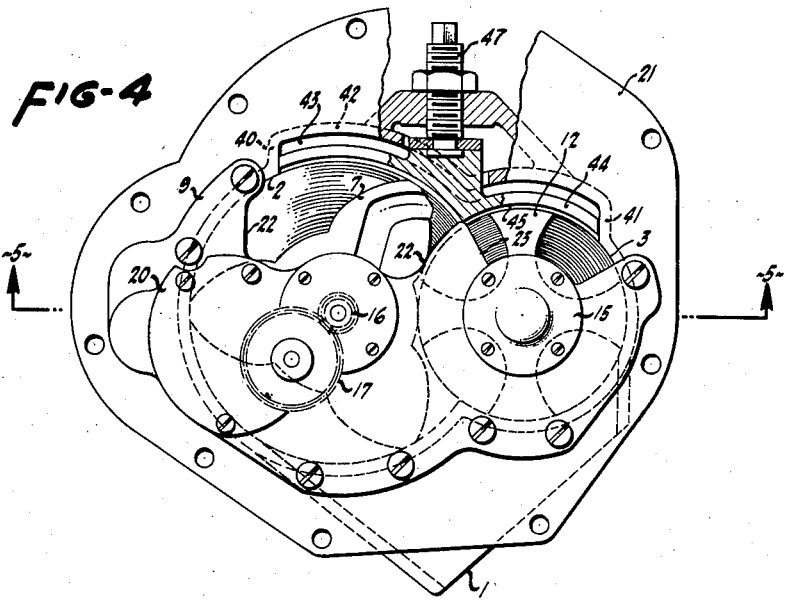
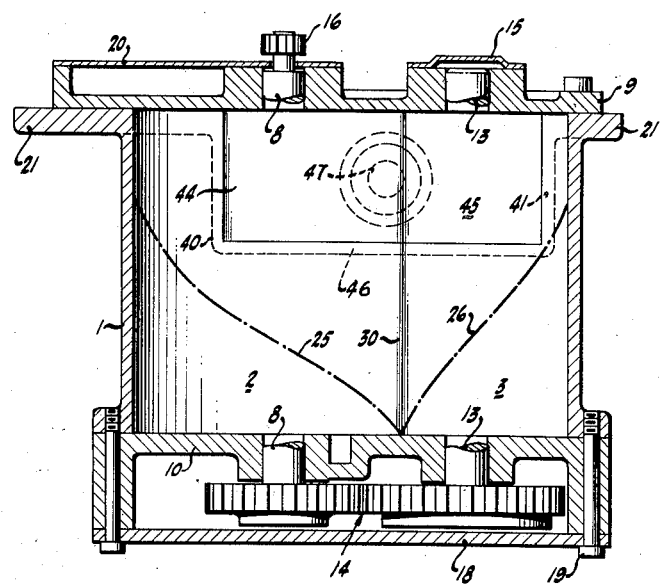
INVENTOR.
WILLIAM F. BERCK
BY
Mellin and Hanscom
ATTORNEYS

United States Patent Office 2,843,094
Patented July 15, 1958

2,843,094

POSITIVE DISPLACEMENT TYPE FLUID METER

William F. Berck, Hayward, Calif., assignor to Ralph N. Brodie Company, San Leandro, Calif., a corporation of California Application June 1, 1956, Serial No. 588,716

6 Claims. (Cl. 121—71)

This invention relates to improvements in positive displacement liquid meters, and more specifically to liquid meters of the type disclosed in my prior Patent No. 2,531,603.

It is an object of the present invention to minimize the turbulence in the discharge of a positive displacement liquid meter whereby the accuracy of the meter may be increased.

A further object is to increase the accuracy of a positive displacement liquid meter by causing the liquid to enter the meter normal to the rotor and to discharge axially of the rotor.

A further object of this invention is to increase the accuracy of a positive displacement liquid meter by causing the liquid to be discharged from the meter axially to the rotor and by providing turbulence decreasing pockets in the rotor bores.

A positive displacement liquid meter of the type disclosed in my United States Patent No. 2,531,603 is referred to as incorporating "capillary seals." This term indicates that the rotors which displace and measure the liquid have no contact with each other or with the walls of the bores within which they operate. These various cooperating elements are so precisely machined as to create minute clearances between their various parts which allow operation without contact and yet keep "slippage" of liquid past these members within a very small amount.

The total throughput of a liquid meter, of the type described in my patent referred to above, is the sum of the calculated positive displacement by the rotor recesses, plus a variable "slippage factor." This slippage factor must be controlled within extremely close limits to meet standards prescribed by the United States National Bureau of Standards, as well as those standards adhered to by other governmental agencies and by the various States and the standards adhered to by most countries of the world.

The slippage in a meter may be ascertained by the use of the orifice formula:

$$Q = CA\sqrt{2gh}$$

in which $Q$ = quantity of slippage liquid,
$C$ = orifice coefficient, which is a factor of the size and shape of the orifice, this being the clearance between the cooperating parts, and the viscosity, temperature and other factors of the fluid passing through the orifice,
$A$ = area of the orifice,
$g$ = acceleration due to gravity,
$h$ = head in feet of liquid across the orifice.

It will be noted that for any given set of conditions in which any one meter is in the flow line of any one fluid, the factors "C," "A" and "g" will be a constant, and that the slippage "Q" will be a function of the head or "h" alone.

Thus, the slippage factor for any one type of liquid will be determined by the orifice dimension, and by the mechanical efficiency and the hydraulic efficiency of the meter. The practical considerations of manufacture allow the slippage orifice to be reduced to a certain minimum area and shape, thus minimizing the effect of the factors "C" and "A" in the orifice formula. However, it is impossible from a practical consideration to reduce the slippage orifice to zero area.

The factor "$h$" is the hydraulic head across the slippage orifice. Ideally, the meter should operate in a fluid stream so that there is no drop in pressure from the inlet to the outlet, in which case the slippage would be zero. However, mechanical friction is one factor which produces a resistance to the flow and creates a pressure drop across the meter, thus producing slippage. Again, practical considerations of manufacture prevent the attainment of a one hundred percent efficient device.

It has been discovered that certain effects of hydraulic inefficiency in the meter also produce a pressure drop across the meter. In a liquid meter, as referred to above, it has been determined by extensive investigation that extreme turbulence in the outlet chamber of the meter seriously affected the accuracy of the meter. This turbulent condition, a hydraulic inefficiency, caused by the configuration of the walls in the outlet chamber, resulted in an opposing force tending to resist the movement of the two rotors in their proper rotation. Any forces which tend to retard the motion of these rotors in displacing or measuring direction increases the differential pressure "$h$" across these rotors, and thus increases the slippage factor through the clearance spaces between the rotor and between the rotor and the walls of the chambers in which they rotate, resulting in a greater inaccuracy of delivery.

This turbulent condition increases as the velocity of the liquid passing through the meter increases, resulting in a progressive increase of the slippage at higher flow rotors.

Therefore, to increase the accuracy of the meter at the higher rate of flow, it is necessary to reduce the turbulence of the liquid discharging from the rotors. This has been done in the present invention by the elimination of the prior outlet chamber into which the slugs of liquid carried by the rotors were discharged normal to the rotor and by providing outlet openings through the end of the casing. The discharge from the rotor is now in axial direction to the rotor and consequently the flow from the meter is in a direction urged by the squeezing action of the rotating and mating rotor lobes and pockets. This greatly reduces the turbulence of the discharging liquid as the liquid is not forced to change its direction of flow from the rotor pockets and lobes, and thus reduces the back drag on the rotors. However, the outlet opening is now limited to the area defined by the flights of the rotor projections and the surfaces of the bores and it was discovered that due to this reduced outlet opening area the flow rate from this opening was greater than with the larger outlet area heretofore used. This increased flow rate resulted in a turbulence which again tended to oppose the rotation of the rotors, in turn increasing the head "$h$" and the consequent slippage.

It was then discovered that the area of the outlet opening could be effectively increased by enlarging the bores of the rotor chamber on the discharge side of the rotors to an extent whereby the flow from the rotor is still essentially axially of these rotors to prevent the turbulence resulting from a straight through passage of the liquid through the meter, and yet give a greater outlet area so that the flow rate through the outlet opening is reduced, to thus reduce the turbulence in the discharging liquid.

With a meter constructed in accordance with the present invention, a decrease in slippage by the factor of ten to one has been realized at the maximum rated flow as compared to the prior construction.

Although it has been found that an increased accuracy has been obtained by the radial enlargement of the rotor bores, no formulae have been developed for the ascertainment of the exact size of the enlargement, and the proper size enlargement must be found empirically by trial with a meter in use with a particular fluid. However, it has been found that for each fluid an optimum size enlargement of the bores may be determined. If the enlargement is too great, the turbulence will increase as a result of straight flow through the meter, and if the enlargement is too small, the turbulence will increase due to the restriction of the outlet opening. In between these two conditions, an optimum enlargement will be found producing a minimum amount of turbulence in the discharging liquid, in turn decreasing the back drag on the rotor and increasing the accuracy of the meter.

The turbulence of the liquid stream is not only a function of the configuration of the walls of the outlet chamber and the velocity of the stream, but is governed by the kinematic viscosity of the liquid. Thus, if a meter is used for different fluids of varying viscosity and for different conditions of flow rates, the size of the optimum radial enlargement of the bores will vary. Therefore, to adapt a single meter to meet these varying conditions I have added an adjustable wall section in the outlet passage of the meter, conforming to the edges of the cylindrical bores. This adjustable wall section permits the radial enlargement of the bore to be varied to adapt the meter to a particular condition of velocity and viscosity of the liquid stream to obtain the most accurate performance characterization.

Of course, if a meter is to be used only for a particular fluid under average conditions, the proper size radial enlargement of the bores may be determined, and a meter may be constructed with a fixed radial bore enlargement for use in the given condition.

Other objects and advantages of the invention will be apparent during the course of the following description.

Figure 2:
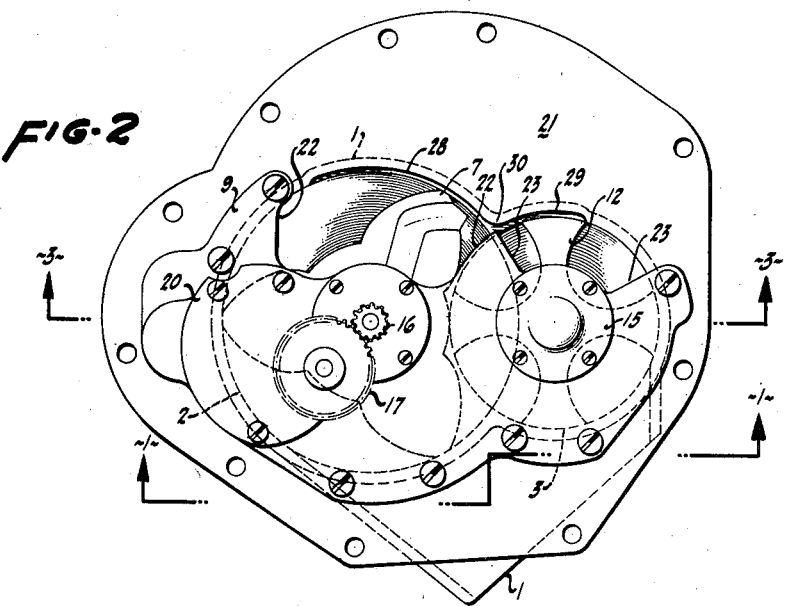
Figure 3:
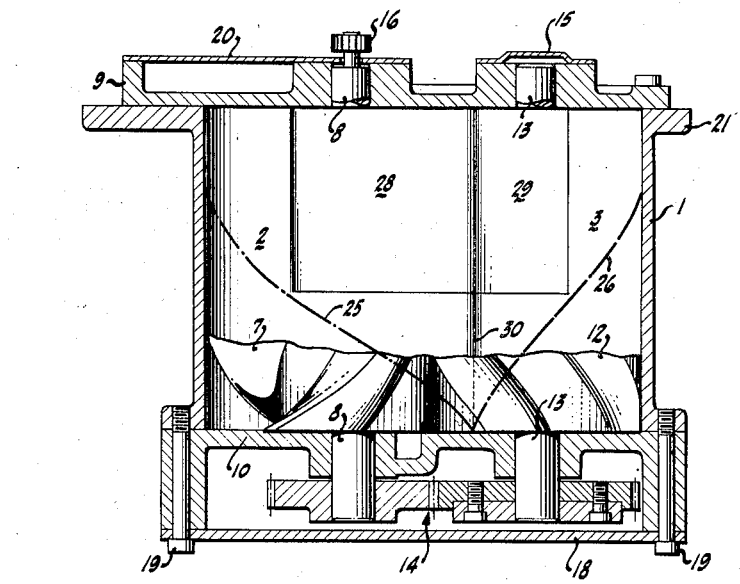

In the accompanying drawings, forming a part of this application, and in which like numerals are employed to designate like parts throughout the same, Fig. 1 is a front elevational view shown partially in section of a positive displacement liquid meter embodying my invention, taken on lines 1—1 of Figure 2, Fig. 2 is a plan view of the same, Fig. 3 is a central vertical sectional view of the same taken along lines 3—3 of Fig. 2, with the rotors shown partially as broken away, Fig. 4 is a plan view, shown partially in section, with parts broken away, of a modification of a meter embodying my invention, and Fig. 5 is a central vertical sectional view taken along lines 5—5 of Figure 4, with the rotors removed.

The present invention is illustrated as applied to a positive displacement liquid meter of the type disclosed in my prior United States Patent No. 2,531,603.

A casing 1 is provided having a pair of parallel intersecting bores 2 and 3. An inlet chamber 4 is formed in the casing 1 exteriorly of one side of the intersecting bores 2 and 3, with an inlet port 6 between the inlet chamber 4 and the bores 2 and 3 to provide a fluid communication therebetween. A first rotor 7 is rotatably mounted in bore 2, the rotor 7 having an integral shaft 8 journaled for rotation in a top plate 9 and a bottom plate 10. A second rotor 12 is rotatably mounted in bore 3, the rotor 12 having an integral shaft 13 journaled for rotation in the top plate 9 and bottom plate 10. Cap plate 15 seals the upper end of shaft 13 from the exterior of the meter.

The first rotor 7 is formed having at least three radially projecting helically extending lobes having surfaces epicycloidal in cross-section transversely of their rotor axis and an outer diameter sealingly fitting the bore 2 as explained in full detail in my prior patent referred to above. The second rotor 12 is also formed in accordance with my prior patent so that it has at least four helically extending sockets having surfaces epitrochoidal in cross-section transversely of their rotor axis, the sockets being complemented to the lobes of the first rotor 7, whereby the two rotors may mesh together to form a constant liquid seal longitudinally between the rotors.

Gear means, indicated generally at 14, provide a connection between the rotors whereby they will rotate in counter direction, with the peripheral speed of the second rotor being equal to the peripheral speed of the first rotor at the root of the lobes.

A gear 16 is mounted on the end of shaft 8, to mesh with gear 17 of the counter mechanism (not shown) to indicate the amount of liquid flowing through the meter.

The inlet port 6 extends on opposite sides of the line of intersection between the outer diameter of the rotors 7 and 12 and has oppositely converging helical side edges, one side 16 conforming to the helix angle of the sockets of rotor 12, and the other side 17 conforming to the helix angle of the lobes of rotor 7, the sides 16 and 17 intersecting at the upper end of the rotors at the point of intersection of the outer diameter of the rotors.

A cover 18 is fastened by means of bolts 19 to the bottom plate 10 to close off the gear means 14, and a top plate 20 closes off the counter mechanism, from the exterior of the meter.

The casing 1 is provided at its upper end with a flange 21, which may be termed a discharge wall, through which the bores 2 and 3 extend. The top cover plate 9 is cut away at 22 and 23 so that outlet zones or openings may be provided. One of these outlet openings is defined by the area formed by the registration of the cut away portion 22 of the top cover plate 9 with the bore 2 and a second outlet zone or opening is defined by the area formed by the registration of the cut away portion 23 of the top cover plate 9 with the bore 3. It is thus seen that liquid will enter the meter through the inlet chamber 4 and inlet port 6 normal to the intersecting rotors 7 and 12, the liquid being carried around the bores 2 and 3 between the lobes of the rotor 7 and in the sockets of rotor 12 to be discharged axially of the rotors 7 and 12 through the outlet openings by the squeezing action of the rotors on the liquid carried thereby, as they mesh together.

The oppositely converging helical dot and dash lines 25 and 26, as shown in Fig. 3, represent an imaginary outlet seal line, the line 25 defined by the helix angle of the lobes of rotor 7, and the line 26 defined by the helix angle of the sockets of rotor 12, the lines 25 and 26 intersecting at the lower end of the rotors at the point of intersection of the outer diameters of the rotors. By the construction of the rotors and the disposition of the rotors in their corresponding bores, the entire area of the bore surfaces above the imaginary seal lines 25 and 26 is out of fluid communication with the inlet port, regardless of the relative positions of the rotors in their respective bores and thus no leak back of the liquid can take place once the rotors have carried their liquid around the bore to the seal lines 25 and 26, except, of course, for the normal amount of slippage between the outer peripheries of the rotors and their respective bores.

In accordance with the invention, the bores 2 and 3 have been radially enlarged as shown at 28 and 29 to increase the effective area of the discharge outlets and thereby reduce the turbulence to a minimum as has been explained above. The radial enlargements 28 and 29 extend from the outer surface of flange 21 inwardly thereof to short of the seal lines 25 and 26. The radial enlargements 28 and 29 also extend from the line of intersection 30 of the two bores 2 and 3 circumferentially of the bores to short of the outlet openings defined by the registration of the cut away portions 22 and 23 of cover plate 9 with the bores 2 and 3. As the areas of radial enlargement are entirely above the seal lines 25 and 26 there can be no leak back past the rotors 7 and 12 to the inlet port. As has been explained, the exact height, width and depth of the radially enlarged bore portions 28 and 29 are dependent upon the particular viscosity of the liquid being metered and for varying flow rates of the liquid. But for a given set of conditions, the radial enlargements may be empirically determined in accordance with the disclosed invention to produce a metered flow of minimum turbulence and thus produce a minimum amount of slippage through the meter.

Figs. 4 and 5 illustrate a modification of the present invention. The form of the invention illustrated in Figs. 2 and 3 is one used for a set of fixed conditions with a predetermined radial enlargement of the bores 2 and 3 to produce a minimum amount of turbulence in the discharge. The form of the invention illustrated in Figs. 4 and 5 is adapted to be used in a metering situation where different liquids and different flow rates are encountered. As has been explained, the amount of radial enlargement of the bores 2 and 3 will vary for different sets of conditions, and the form of the invention now illustrated may be used to obtain the required radial enlargement as the conditions are varied.

The back wall of the casing 1 is provided with two parallel side walls 40 and 41, intersecting the bores 2 and 3. A rear wall 42 and bottom wall 46, together with the side walls 40 and 41, define a compartment 43. A wall 44, having a front surface 45 conforming to the intersecting bore surfaces 2 and 3, is movably mounted in the compartment 43, for motion normal to and towards and from the rotors 7 and 12. Screw means 47 are provided whereby the movable wall 44 may be adjusted in compartment 43 to provide varying degrees of radial enlargement of the bores 2 and 3, thereby varying the effective areas of the discharge outlets. The wall 44 extends upwardly flush with the flange 21 of the meter, and inwardly of the flange 21 to bottom wall 46 short of the seal lines 25 and 26. The wall 44 extends circumferentially of the bores 2 and 3 from the line of intersection 30 to short of the outlet openings defined by the registration of the cut away portions 22 and 23 of cover plate 9 with the bores 2 and 3. Thus, the entire surface 45 of the moveable wall 44 is above the discharge seal lines 25 and 26 to prevent leak back.

It is to be understood that the form of my invention, herewith shown and described, is to be taken as a preferred example of the same, and that various changes in the shape, size and arrangement of parts may be resorted to, without departing from the spirit of my invention, or the scope of the following claims.

Having thus described my invention, what I claim and desire to secure by Letters Patent is:

1. A positive displacement liquid meter for metering a particular liquid comprising a casing having a pair of parallel intersecting cylindrical bores therein, a first rotor rotatably mounted in one of said bores, a second rotor rotatably mounted in the other of said bores, each said rotor having its outer diameter sealingly engaging the bore in which it is mounted, helical screw means on said rotors enabling said rotors to sealingly mesh at their point of intersection, said casing having an inlet opening intersecting one side of said intersecting bores and an outlet openng formed by the extension of the intersecting bores extending through said casing whereby the liquid may enter the casing normal to said motors to be entrained by and carried by said helical screw means around the periphery of said bores to be discharged by the meshing action of said rotors through said outlet opening axially to said rotors, one of said bores being radially enlarged at the outlet opening, said radial enlargement extending inwardly of such opening to short of the discharge seal line and extending circumferentially from the line of intersection of said bores to short of the outlet opening, said radial enlargement being sufficiently great as to increase the effective area of the outlet opening to reduce the turbulence resulting from axial flow through a restricted outlet opening, and being sufficiently small as to cause substantially all of the liquid discharging from said outlet opening to flow axially of said rotors to reduce the turbulence resulting from a discharge flow normal to said rotors, whereby the total turbulence of the axial flow turbulence and the normal flow turbulence of the particular liquid discharging from said meter is reduced to a minimum.

2. A positive displacement liquid meter for metering a particular liquid comprising a casing having a pair of parallel intersecting cylindrical bores therein, an inlet chamber formed therein exteriorly of one side of the bores, and an inlet port between the inlet chamber and the bores, a first rotor rotatably mounted in one bore, a second rotor rotatably mounted in the other bore, the first rotor having at least three radially projecting, helically extending lobes having surfaces epicycloidal in cross-section transversely of their rotor axis and an outer diameter sealingly fitting the bore, the second rotor having a diameter sealingly fitting its bore and engaging the periphery of the first rotor at the root of the lobes, a connection between the rotors whereby they will rotate in counter direction with the peripheral speed of the second rotor being equal to the peripheral speed of the first rotor at the root of the lobes, the second rotor having at least four helically extending sockets having surfaces epitrochoidal in cross-section transversely of their rotor axis and complemental to the lobes to mesh therewith to form a constant liquid seal longitudinally between the rotors, the inlet port extending on opposite sides of the line of intersection between the outer diameter of the rotors and having oppositely converging helical side edges or conforming to the helix angle of the sockets and the other to the helix angle of the lobes, and intersecting at one end of the rotors at the point of intersection of the outer diameter of the rotors, a discharge wall on said casing, said intersecting bores extending through said discharge wall to form an outlet opening therethrough, whereby the fluid may enter the rotors normal thereto and to be discharged from said rotor by the meshing action thereof axially thereto through said outlet opening, one of said bores being radially enlarged at the outlet opening, said radial enlargement extending inwardly of such opening to short of the discharge seal line and extending circumferentially from the line of intersection of said bores to short of the outlet opening, said radial enlargement being sufficiently great as to increase the effective area of the outlet opening to reduce the turbulence resulting from axial flow through a restricted outlet opening, and being sufficiently small as to cause substantially all of the liquid discharging from said outlet opening to flow axially of said rotors to reduce the turbulence resulting from a discharge flow normal to said rotors, whereby the total turbulence of the axial flow turbulence and the normal flow turbulence of the particular liquid discharging from said meter is reduced to a minimum.

3. A positive displacement liquid meter for metering a particular liquid comprising a casing having a pair of parallel intersecting cylindrical bores therein, an inlet chamber formed therein exteriorly of one side of the bores, and an inlet port between the inlet chamber and the bores, a first rotor rotatably mounted in one bore, a second rotor rotatably mounted in the other bore, the first rotor having at least three radially projecting, helically extending lobes having surfaces epicycloidal in cross-section transversely of their rotor axis and an outer diameter sealingly fitting the bore, the second rotor having a diameter sealingly fitting its bore and engaging the periphery of the first rotor at the root of the lobes, a connection between the rotors whereby they will rotate in counter direction with the peripheral speed of the second rotor being equal to the peripheral speed of the first rotor at the root of the lobes, the second rotor having at least four helically extending sockets having surfaces epitrochoidal in cross-section transversely of their rotor axis and complemental to the lobes to mesh therewith to form a constant liquid seal longitudinally between the rotors, the inlet port extending on opposite sides of the line of intersection between the outer diameter of the rotors and having oppositely converging helical side edges, one conforming to the helix angle of the sockets and the other to the helix angle of the lobes, and intersecting at one end of the rotors at the point of intersection of the outer diameter of the rotors, a discharge wall on said casing, said intersecting bores extending through said discharge wall to form an outlet opening therethrough, whereby the fluid may enter the rotors normal thereto and to be discharged from said rotor by the meshing action thereof axially thereto through said outlet opening, said intersecting bores being radially enlarged at their discharge ends and extending inwardly therefrom short of the discharge seal lines of the bores, said radial enlargement extending circumferentially of the bores from the line of intersection thereof to short of the outlet zones, said radial enlargement being sufficiently great as to increase the effective area of the outlet opening to reduce the turbulence resulting from axial flow through a restricted outlet opening, and being sufficiently small as to cause substantially all of the liquid discharging from said outlet opening to flow axially of said rotors to reduce the turbulence resulting from a discharge flow normal to said rotors, whereby the total turbulence of the axial flow turbulence and the normal flow turbulence of the particular liquid discharging from said meter is reduced to a minimum.

4. A positive displacement liquid meter comprising a casing having a pair of parallel intersecting cylindrical bores, a first rotor rotatably mounted in one of said bores, a second rotor rotatably mounted in the other of said bores, each said rotor having its outer diameter sealingly engaging the bore in which it is mounted, helical screw means on said rotors enabling said rotors to sealingly mesh at their point of intersection, said casing having an inlet opening intersecting one side of said intersecting bores and an outlet opening formed by the extension of the intersecting bores extending through said casing whereby the liquid may enter the casing normal to said motors to be entrained by and carried by said helical screw means around the periphery of said bores to be discharged by the meshing action of said rotors through said outlet opening axially to said rotors, said casing being further provided with a compartment formed therein on the side opposite to said inlet, said compartment having parallel side walls intersecting said bores, a wall in said compartment between said side walls thereof and movable towards and away from said rotor, said movable wall having one side conforming to said intersecting bores, and means to move said movable wall towards and away from the rotor whereby the movable wall may be set at an optimum distance from said rotors for a particular rate of flow of a particular liquid to produce a minimum amount of turbulence resulting from flow axially of said rotor through a restricted opening and from flow normal to said rotors.

5. A positive displacement liquid meter comprising a casing provided with a pair of parallel intersecting cylindrical bores, an inlet chamber formed therein exteriorly of one side of the bores, and an inlet port between the inlet chamber and the bores, a first rotor rotatably mounted in one bore, a second rotor rotatably mounted in the other bore, the first rotor having at least three radially projecting, helically extending lobes having surfaces epicycloidal in cross-section transversely of their rotor axis and an outer diameter sealingly fitting the bore, the second rotor having a diameter sealingly fitting its bore and engaging the periphery of the fist rotor at the root of the lobes, a connection between the rotors whereby they will rotate in counter direction with the peripheral speed of the second rotor being equal to the peripheral speed of the first rotor at the root of the lobes, the second rotor having at least four helically extending sockets having surfaces epitrochoidal in cross-section transversely of their rotor axis and complemental to the lobes to mesh therewith to form a constant liquid seal longitudinally between the rotors, the inlet port extending on opposite sides of the line of intersection between the outer diameter of the rotors and having oppositely converging helical side edges of conforming to the helix angle of the sockets and the other to the helix angle of the lobes, and intersecting at one end of the rotors at the point of intersection of the outer diameter of the rotors, a discharge wall on said casing, said intersecting bores extending through said discharge wall to form an outlet opening therethrough, whereby the fluid may enter the rotors normal thereto and to be discharged from said rotor by the meshing action thereof axially thereto through said outlet opening, said casing being further provided with a compartment formed therein on the side opposite to said inlet, said compartment having parallel side walls intersecting said bores, a wall in said compartment between said side walls thereof and movable towards and away from said rotor, said movable wall having one side conforming to said intersecting bores, and means to move said movable wall towards and away from the rotor whereby the movable wall may be set at an optimum distance from said rotors for a particular rate of flow of a particular liquid to produce a minimum amount of turbulence resulting from flow axially of said rotor through a restricted opening and from flow normal to said rotors.

6. A positive displacement liquid meter comprising a casing provided with a pair of parallel intersecting cylindrical bores, an inlet chamber formed therein exteriorly of one side of the bores, and an inlet port between the inlet chamber and the bores, a first rotor rotatably mounted in one bore, a second rotor rotatably mounted in the other bore, the first rotor having at least three radially projecting, helically extending lobes having surfaces epicycloidal in cross-section transversely of their rotor axis and an outer diameter sealingly fitting the bore, the second rotor having a diameter sealingly fitting its bore and engaging the periphery of the first rotor at the root of the lobes, a connection between the rotors whereby they will rotate in counter direction with the peripheral speed of the second rotor being equal to the peripheral speed of the first rotor at the root of the lobes, the second rotor having at least four helically extending sockets having surfaces epitrochoidal in cross-section transversely of their rotor axis and complemental to the lobes to mesh therewith to form a constant liquid seal longitudinally between the rotors, the inlet port extending on opposite sides of the line of intersection between the outer diameter of the rotors and having oppositely converging helical side edges or conforming to the helix angle of the sockets and the other to the helix angle of the lobes, and intersecting at one end of the rotors at the point of intersection of the outer diameter of the rotors, a discharge wall on said casing, said intersecting bores extending through said discharge wall to form an outlet opening therethrough, whereby the fluid may enter the rotors normal thereto and to be discharged from said rotor by the meshing action thereof axially thereto through said outlet opening, said outlet casing being further provided with a compartment formed therein on the side opposite to said inlet, said compartment having parallel side walls intersecting said bores, a wall in said compartment between said side walls thereof and movable towards and away from said rotor, said movable wall having one side conforming to said intersecting bores, said movable wall extending inwardly of said discharge wall short of the discharge seal line, and extending circumferentially of the bores from the line of intersection thereof to short of the discharge opening, and means to move said movable wall towards and away from th rotor whereby the movable wall may be set at an optimum distance from said rotors for a particular rate of flow of a particular liquid to produce a minimum amount of turbulence resulting from flow axially of said rotor through a restricted opening and from flow normal to said rotors.

References Cited in the file of this patent

UNITED STATES PATENTS

| | | |
|---|---|---|
| 294,026 | Fitts | Feb. 26, 1884 |
| 2,484,849 | Paget | Oct. 18, 1949 |
| 2,531,603 | Berck | Nov. 28, 1950 |